United States Patent [19]

Crisci

[11] 4,225,303
[45] Sep. 30, 1980

[54] BLOW MOLDING DEVICES

[75] Inventor: Harry Crisci, New Castle, Pa.

[73] Assignee: Northern Engineering & Plastics Corporation, New Castle, Pa.

[21] Appl. No.: 13,268

[22] Filed: Feb. 21, 1979

[51] Int. Cl.³ ............................................. B29C 17/07
[52] U.S. Cl. ................................... 425/525; 264/533; 425/527; 425/535
[58] Field of Search ............... 425/525, 527, 531, 535; 264/533

[56] References Cited

U.S. PATENT DOCUMENTS

| 3,369,272 | 2/1968 | Martin, Jr. et al. | 264/533 X |
| 3,502,758 | 3/1970 | Plummer | 264/520 |
| 3,907,475 | 9/1975 | Bowers | 425/535 X |
| 4,032,278 | 6/1977 | Kuenzig et al. | 425/525 |

Primary Examiner—Jan H. Silbaugh
Attorney, Agent, or Firm—Webster B. Harpman

[57] ABSTRACT

Devices for making hollow articles such as bottles from thermoplastic resin with a blow mold wherein a parison in the mold is shaped by air blown through a blow pin carrying a mandrel arranged to seal a portion of the parison with respect to a section of the mold in order to provide an additional quantity of thermoplastic resin in a critical area to be subsequently shaped in a smooth inner annular surface by the mandrel.

4 Claims, 5 Drawing Figures

BLOW MOLDING DEVICES

BACKGROUND OF THE INVENTION (1) Field of the Invention:

This invention relates to blow molding devices in which thermoplastic materials such as resins are shaped into various hollow articles.

(2) Description of the Prior Arts:

Typical patents illustrating the prior art comprise U.S. Pat. Nos. 3,325,860; 3,640,672; 3,806,587; 3,899,279; 3,910,746 and 3,969,060. Each of these several prior art patents discloses a blow molding device and each is directed to some specific improvement.

In U.S. Pat. No. 3,325,860 the improvement related to providing the mold sections with suction nozzles for applying suction to the outside of the upper end of the parison within the mold.

In U.S. Pat. No. 3,640,672 the improvement provides the formation of the blow pin with openings arranged so that air blown through one of the openings blows the container body and the air directed through the other opening blows the handle of the particular article disclosed in the patent.

In U.S. Pat. No. 3,806,587 a principal point of novelty relates to the arrangement of the apparatus for stretching a pinched portion of the parison while the latter is in a closed mold prior to or during the inflation of the pinched parison portion which has been chilled to partially reduce the temperature thereof.

In U.S. Pat. No. 3,899,279 the novelty comprises the formation of a blow mold with neck forming jaws with spaced apart choke rings which restrict the movement of the thermoplastic material from the neck area of the container during the formation of the same.

U.S. Pat. No. 3,910,746; a blow molding apparatus is disclosed which includes an improved cooling system to rapidly reduce the temperature of the thermoplastic material by introducing a coolant directly into the blown article.

In U.S. Pat. No. 3,969,060 blow molding apparatus is disclosed in which the parison of thermoplastic material is preheated and then gripped so as to reduce the cross section of the gripped portion which results in the deformation of the gripped portion to provide a desired profile formation.

None of the prior art of the aforesaid patents disclose blow molding devices wherein blow molds and more particularly the neck ring or shear insert thereof is provided with notches in the engaging portions thereof which define the pinch-off of the thermoplastic material on the so called pinch-off line of the article being formed so that additional quantities of the thermoplastic material are present in indicated critical areas which can then be smoothed by the withdrawing blow pin and mandrel to form a smooth inner annular surface completely eliminating the pinch off groove heretofore formed on the inner surface of a hollow article formed in accordance with the prior art techniques.

SUMMARY OF THE INVENTION

A blow molding device is disclosed which comprises a blow mold the half portions of which are provided with shear inserts for pinching off the upper and lower ends of the parison of thermoplastic material positioned in the mold halves. Notches are formed in the edges of the shear inserts defining the pinch-off line of the parison and the article blow molded therefrom to retain additional amounts of thermoplastic material in the areas of the pinch-off line where it crosses critical areas of the surface defining the inner configuration of the blow molded article such as the neck or finish portion thereof.

DESCRIPTION OF THE PREFERRED EMBODIMENT

Figure 1:
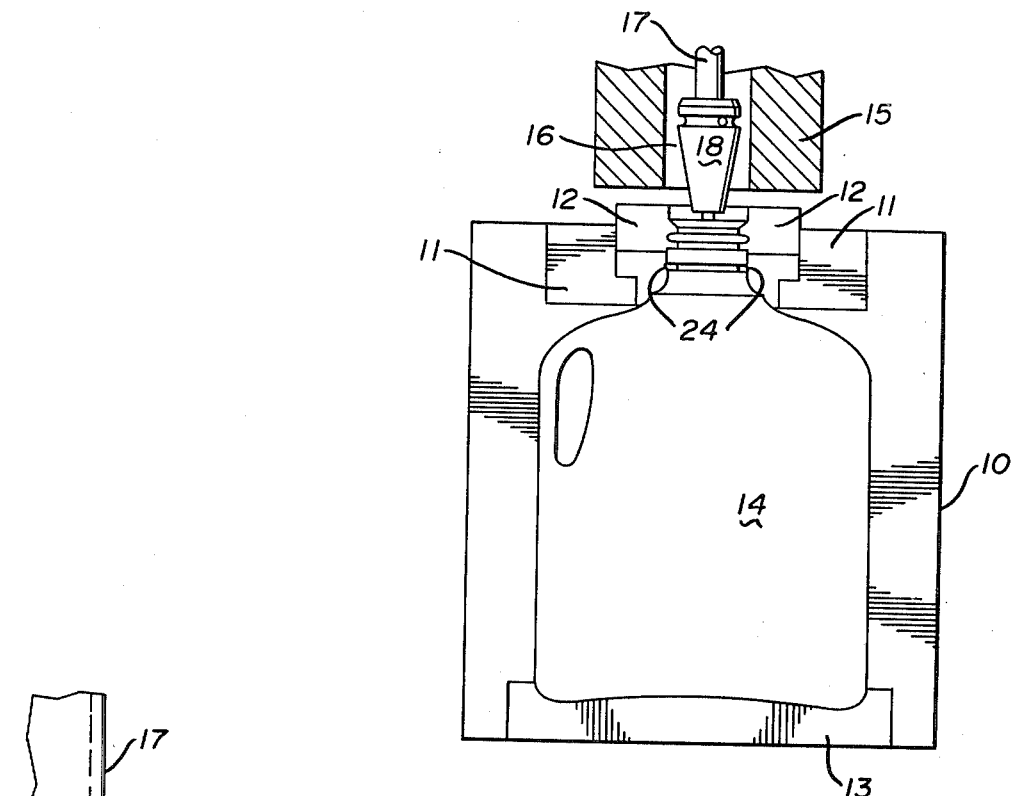
FIG. 1 is a plan view of one half portion of a blow mold positioned below an extruding head and a blow pin.
Figure 2:
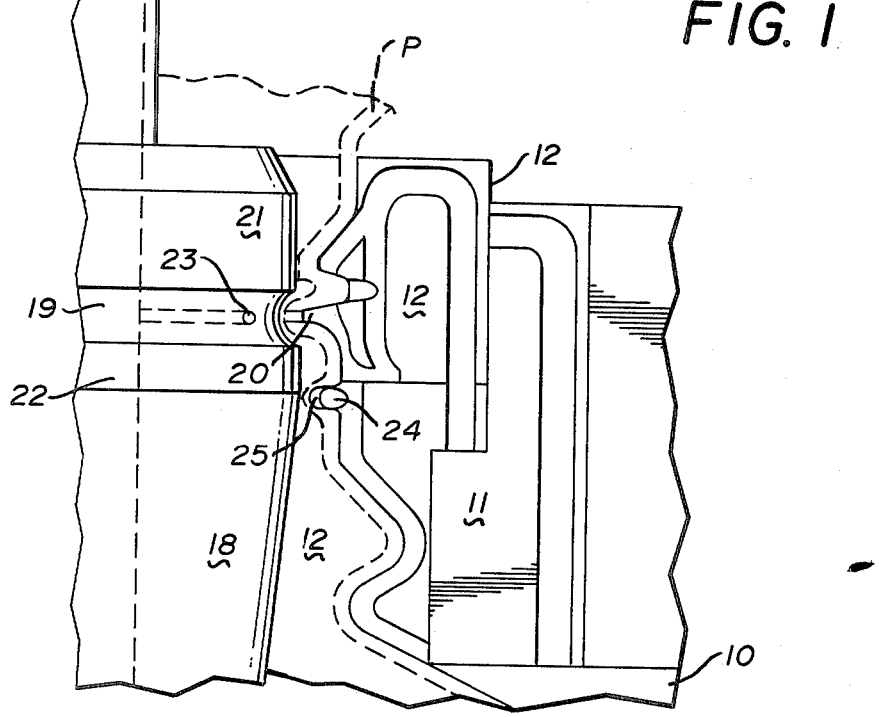
FIG. 2 is an enlarged detailed elevation of a portion of the blow mold and blow pin of FIG. 1 with broken lines illustrating the blown thermoplastic material being formed therein.
Figure 3:
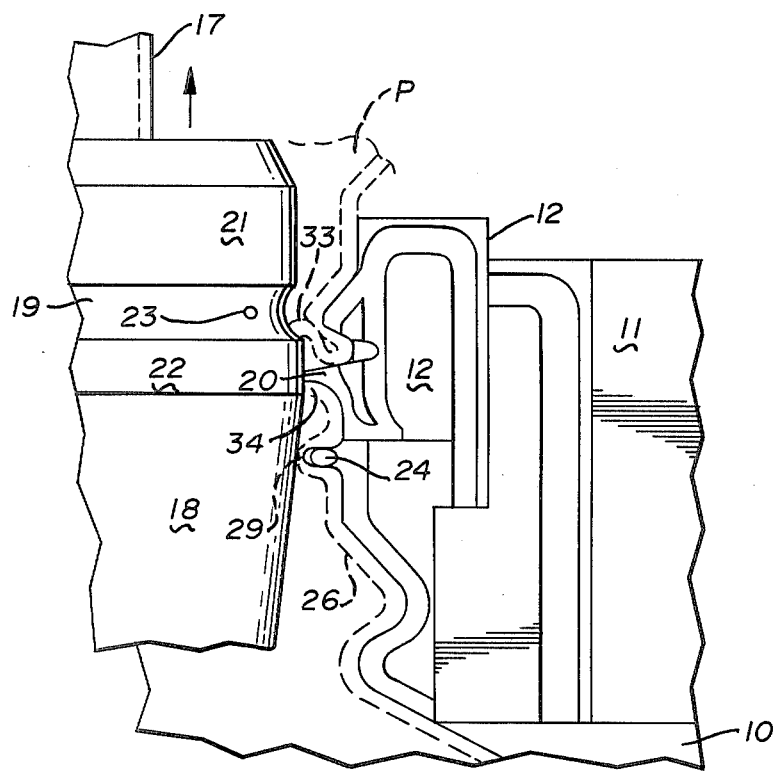
FIG. 3 is a view similar to FIG. 2 showing the blow pin and mandrel being removed outwardly with broken lines illustrating the sheared flash of the parison.

In FIGS. 1, 2 and 3 of the drawings, a half portion 10 of a blow mold may be seen to include a neck ring 11 and a first shear insert 12 at one end thereof and a second shear insert 13 at the other end thereof. The half mold 10 and another half thereof, not shown, when moved together will define a mold cavity 14. An extruder head 15 is arranged in relation to the mold 10 so that a tubular parison may be delivered through a passageway 16 in the extruder head and positioned longitudinally of the mold cavity 14. A mandrel 18 is positioned on a blow pin 17.

Those skilled in the art will observe that the two half mold portions, one of which is illustrated herein, will when arranged in a blow molding machine define the mold cavity 14 so that a tubular parison of thermoplastic resin or the like delivered through the passageway 16 in the extruder head 15 and around the mandrel 18 may be shaped by the introduction of air through the blow pin 17 which extends through the mandrel 18.

By referring to FIG. 2 of the drawings, it will be seen that a tubular parison of thermoplastic material is indicated by the letter P and that the blow pin 17 and its mandrel 18 have been moved into a position within the first shear insert 12 and neck ring 11 and wherein an annular groove 19 in the mandrel 18 is located in oppositely disposed relation to an inner annular shoulder 20 on the shear insert 12. The mandrel 18 has annular portions 21 and 22 immediately adjacent the annular groove 19. The annular portion 22 being of larger diameter than the annular portion 21. The arrangement is such that the annular portions 21 and 22 form closures with respect to the adjacent portions of the shear inserts 12 when the thermoplastic material P of the parison is positioned therebetween as shown by the broken lines in FIG. 2.

One or more drilled passageways 23 establish communication between the blow pin 17 and the annular groove 19 and air blown through the blow pin 17 is thus delivered to the area between the closures formed by the annular portions 21 and 22 and therefore shapes the parison in this area of the blow mold.

Still referring to FIG. 2 of the drawings, it will be seen that a notch 24 is formed in the first shear insert 12 and in the area of an annular rib 25 which forms the desired inner annular configuration of the finish or neck portion of the bottle being blown in the blow molding device. The notch 24 illustrated in FIG. 2 of the drawings is on the pinch-off line of the parison and by referring again to FIG. 1 of the drawings it will be seen that a comparable notch 24 is formed on the other side of the shear insert 12 so that it is also located on the pinch-off line of the parison where it crosses the annular rib configuration 25. The closing off of the area between the annular portions 20 and 21 of the mandrel and directing air thereinto by way of the passageway 23 and the annular groove 19 desirably shapes the parison in this area and moves a small extra amount of the thermoplastic material of the parison P in the areas of the notches 24 so that when the blow pin 17 and the mandrel 18 move outwardly of the blow mold, upwardly in FIGS. 1 and 2 and 3 of the drawings, the annular portion 22 imparts a smooth annular inner surface to the annular portion of the blown bottle shape which corresponds with the annular rib 25 by pulling the extra material from the notches 24 over the rib 25.

Figure 4:
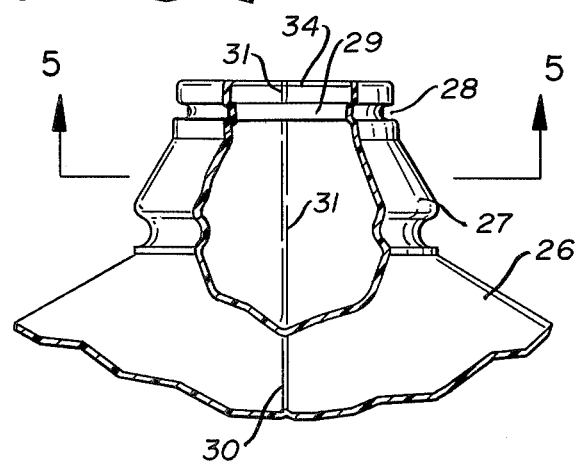
FIG. 4 is a portion of a bottle with parts broken away and parts in cross section showing the neck finish and the elimination of the groove defining the pinch-off line on the inner surface thereof.
Figure 5:
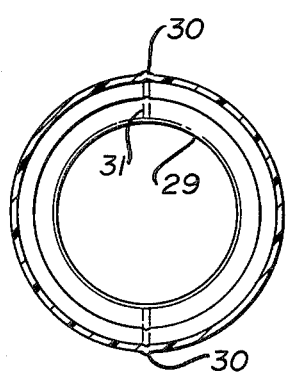
FIG. 5 is a horizontal section on line 5—5 of FIG. 4 illustrating the smooth inner annular surface of the critical area of the neck finish at the pinch-off line.

By referring to FIGS. 4 and 5 of the drawings, the resultant smooth annular surface may be seen. In FIG. 4 a portion of a blow molded bottle 26 has a neck portion or finish 27 which tapers upwardly and inwardly and an annular groove 28 in the exterior thereof forms an inwardly disposed annular rib 29 which is spaced inwardly from the upper open end of the neck or finish of the bottle 26. The inner annular rib 29 is provided to form a smooth annular area of uniform diameter against which a depending flange on a bottle cap, not shown, may be engaged when the bottle cap is positioned on the finish of the bottle and held thereon by snap-in relation with respect to the annular groove 28. The smooth surface of the inner annular rib 29 forms a liquid tight seal when so engaged by a depending annular flange on a bottle cap.

Bottles with neck finishes as heretofore formed in blow molds have always had objectionable pinch-off line ribs on the exterior of the neck finish and pinch-off line grooves on the interior of the neck finish.

Caps as heretofore applied to blow molded bottles were not liquid tight due to the pinch-off line ribs and grooves and the prior art bottles frequently had mechanical smoothing performed on the exterior and upper surfaces of the neck finish to eliminate the pinch off line ribs so that the caps when applied would be liquid tight. Frequently even such mechanical smoothing failed and many bottle caps have been provided with foam inserts to insure a liquid tight seal between the cap and the finish of the bottle. Such bottles are widely used for the packaging of milk and other liquids and it is therefore essential that a liquid tight closure between the cap and the bottle finish of the neck portion be achieved.

The present invention produces a blow molded bottle with an inner smooth annular rib against which a flange on a bottle cap will form a liquid tight seal when engaged therewith.

In FIGS. 4 and 5 of the drawings, the pinch-off rib on the exterior of the bottle is indicated by the numeral 30 and the pinch off line groove on the interior of the bottle is indicated by the numeral 31 and it will be observed that the inner surface of the annular rib 29 is uniformly smooth as the pinch-off line groove has been completely eliminated by the extra material that had been positioned in the notches 24 in the shear inserts 12 and which extra material was smoothed by the movement of the annular portion 22 of the mandrel 18 thereagainst when the blow pin 17 and the mandrel 18 were withdrawn from the bottle being blown.

By referring now to FIG. 3 of the drawings, it will be seen that the blow pin 17 is illustrated moving outwardly of the mold 10 and the shear inserts 12 with respect to the position illustrated in FIG. 2 of the drawings and heretofore described. In FIG. 3 of the drawings, the larger annular portion 22 of the mandrel 18 has moved upwardly so as to smooth and move the extra thermoplastic material in the notches 24 to form the smooth inner annular surface of the annular rib 29 as hereinbefore described and has shearingly engaged the parison P with respect to the inner annular shoulder 20 so as to separate the same and cause it to roll upwardly as shown in broken lines and indicated by the numeral 33. The shearing of the parison P forms the uppermost inturned edge 34 of the neck or finish portion of the bottle being blown.

It will thus be seen that blow molding devices have been disclosed which act to form a blow molded article, such as a bottle, and more particularly the neck or finish portion thereof with a smooth continuous inner annular rib against which a flange on a closure cap can form a liquid tight seal and that the formation of the smooth surface on the inner annular rib is caused by the relative action of the desirably shaped mandrel, introduction of air through the mandrel into areas of the tubular parison between closures defined by the mandrel and the mold, and the positioning of extra quantities of the thermoplastic material on the pinch-off lines of the parison through the expediency of the notches formed in the shear inserts of the mold which provide the extra material for filling and smoothing the pinch-off line grooves in the article being blown.

The blow molded bottle or other article formed in the novel blow molding device requires no further mechanical finishing or smoothing operations and therefore considerably improves production rate and reduces production costs while at the same time forming a perfect finish on a bottle or similar article which will receive and retain a cap in liquid tight relation.

Although but one embodiment of the present invention has been illustrated and described, it will be apparent to those skilled in the art that various changes and modifications may be made therein without departing from the spirit of the invention and having thus described my invention what I claim is:

1. Blow molding devices for forming a blown plastic article from an elongated essentially tubular parison comprising; a sectional blow mold defining a cavity corresponding to the configuration of said blown plastic article, surfaces of said mold defining a bore for forming an article neck forming portion of said mold, said bore opening into the cavity of said mold, a rib on said bore defining surfaces for forming an inner annular rib in said neck portion of said article, a blow pin having a mandrel thereon and movable in said parison in said bore, an annular groove in said mandrel spacing portions of said mandrel, said spaced portions of said mandrel arranged to form spaced closures with respect to spaced areas of said bore forming surfaces of said mold, sections of said mold forming pinch-off areas and notches formed in said mold adjacent said rib on said bore defining surfaces and in said pinch-off areas for receiving material from said parison, one of said spaced portions of said mandrel arranged to move said material in said notches whereby grooves blown in the inner surface of the annular rib of said blown plastic article are filled by said material and smoothed by said spaced portion of said mandrel so as to form a continuously smooth innermost surface on said annular rib of said blown plastic article, means in said mandrel establishing communication between said annular groove and said blow pin so that air from said blow pin moves by way of said groove toward said parison between said closures.

2. The blow molding devices set forth in claim 1 and wherein said means in said mandrel comprises at least one passageway communicating with a passageway in said blow pin.

3. The blow molding devices set forth in claim 1 and wherein said annular rib on said surfaces defining said bore forms one of said spaced areas with respect to said spaced portions of said mandrel in forming said spaced closures.

4. The blow molding devices of claim 1 and wherein said spaced portions of said mandrel are annular and of different diameters with said spaced portion of said mandrel adjacent said cavity being larger than the other.

* * * * *